United States Patent [19]
Cherian

[11] Patent Number: 5,229,813
[45] Date of Patent: Jul. 20, 1993

[54] COMPOSITE BACKUP ROLLER ASSEMBLY

[75] Inventor: Abraham Cherian, Webster, N.Y.

[73] Assignee: Xerox Corporation, Stamford, Conn.

[21] Appl. No.: 753,158

[22] Filed: Aug. 30, 1991

[51] Int. Cl.⁵ ............................................. G03G 15/00
[52] U.S. Cl. .................................. 355/200; 355/212; 492/47; 492/58; 492/59
[58] Field of Search ........................ 355/200, 211, 212; 29/123, 132, 130

[56] References Cited

U.S. PATENT DOCUMENTS

| | | | |
|---|---|---|---|
| 3,662,446 | 5/1972 | Walls | 29/132 X |
| 3,786,549 | 1/1974 | Pott | 29/132 X |
| 4,062,098 | 12/1977 | Brugman | 29/123 |
| 4,178,094 | 12/1979 | Silverberg | 355/212 |
| 4,186,162 | 1/1980 | Daley | 264/46.5 |
| 4,221,480 | 9/1980 | Spehrley, Jr. | 355/212 |
| 4,268,943 | 5/1981 | Watanabe et al. | 29/131 |
| 4,293,989 | 10/1981 | Schneider | 29/132 X |
| 4,399,169 | 8/1983 | McGowan | 29/123 X |
| 4,440,295 | 4/1984 | Blackwood et al. | 29/132 X |
| 4,583,272 | 4/1986 | Keller | 29/132 X |
| 4,601,963 | 8/1986 | Takahashi et al. | 430/69 |
| 4,743,937 | 5/1988 | Martin | 355/259 |
| 4,827,305 | 5/1989 | Enoguchi et al. | 355/259 |
| 4,841,613 | 6/1989 | Beery et al. | 29/132 X |
| 4,862,211 | 8/1989 | Kutami et al. | 355/212 |
| 4,910,844 | 3/1990 | Lioy et al. | 29/132 X |
| 4,914,478 | 4/1990 | Yashiki | 29/123 X |
| 5,133,125 | 7/1992 | Diebels et al. | 29/123 X |

Primary Examiner—A. T. Grimley
Assistant Examiner—Nestor R. Ramirez
Attorney, Agent, or Firm—Oliff & Berridge

[57] ABSTRACT

A backup roller assembly having a plurality of rollers for applying pressure to an inside surface of a photoreceptor web, and a process for making such backup rollers is disclosed wherein a thin walled tube is extruded from a metallic or polymeric material. After extrusion, the tubing is cut to a desired length and filled with a filler, preferably a urethane foam for providing support for the thin-walled tubing, for the adhesion of journals at each end of the tube and for grounding the photoreceptor web. After the journals are attached at each end of the tubing by the adhesion of the foam, the backup roller can be ground to a precise outer diameter. In a final step, the journals are machined to the proper specifications.

9 Claims, 5 Drawing Sheets

COMPOSITE BACKUP ROLLER ASSEMBLY

BACKGROUND OF THE INVENTION

The present invention is generally directed to a backup roller assembly for a web-type photoreceptor in an electrostatographic printer. More specifically, the present invention is directed to a backup roller assembly which comprises a thin-walled cylindrical metal tubing filled with a urethane foam. The roller backup assembly of the present invention is useful in a number of imaging processes.

The development of images by various methods, including electrostatographic means, is well known. In several of these methods, toner particles are deposited on an electrostatic latent image present on an insulating surface, such as selenium, utilizing, for example, cascade development, magnetic brush development, powder cloud development, and touchdown development. In view of several disadvantages associated with two-component systems, considerable effort has been directed to designing processes which utilize toner particles only.

In many of the single component development processes, conductive toner particles are selected, and imagewise toner deposition onto the photoconductive member is obtained by induction charging of the toner particles. Electrostatic transfer of conductive toner particles to plain bond paper is, however, usually inefficient as the charge on the toner particles can be reversed by induction charging from the paper during the transfer step. Accordingly, electrophotographic systems wherein conductive single component toner particles are used can require a special overcoated insulating paper to achieve sufficient electrostatic toner transfer. Furthermore, in single component processes with conductive toner particles the control of undesirable background, or background suppression, cannot usually be achieved with electrostatic forces as the toner particles are inductively charged, and deposited on the image bearing member, which is not the situation with two-component developer processes where control of background development is accomplished by electrostatic forces acting on the triboelectrically charged toner particles, causing these particles to be directed away from image bearing members.

In an electrostatographic imaging system using a web-type photoreceptor, the web is entrained by a drive roller around a plurality of backup rollers as it is conveyed past the various stations in the printing process, the backup rollers press from the inside of the web to minimize any undesirable movement of the web. In order for good printing quality to result, the web must be sufficiently taut at the various stations in the printing process so that such undesirable movement does not occur. In addition, it is desirable that the web does not slacken or slip during operation (particularly at the imaging and developing stations), and that the rollers do not damage the web material. It is also desirable that the rollers be lightweight so that the time and power required to start and stop the movement of the web is reduced.

In U.S. Pat. No. 4,221,480 rollers are disclosed which have a plurality of spaced, flexible discs extending outwardly from the exterior surface. The portion or segment of the disc contacting the region of the belt passing thereover provides support therefor. Each of the plurality of discs on the roller supporting the belt are deflected and returned to their original position when not supporting the belt.

U.S. Pat. No. 4,862,211 discloses an apparatus for conveying and rotating an image-forming belt while supporting the belt by at least two rolls. The surface of at least one roll is coated with short fibers such as wool, flax, silk or cotton. The rollers can also be covered with a thread wound around the surface, or a cloth such as made from nylon material.

U.S. Pat. No. 4,910,844 discloses an aluminum roller for conveying a web. The aluminum roller has a surface which is prepared by blasting the surface of the roller with a steel shot to create on the surface a deep texture with well rounded down features and sharp up features with peaks. The blasted surface is finished with a grinding action for removing the peaks to produce plateaus surrounded by interconnected channels. The interconnected channels of the surface allow air entrained between the roller surface and a web to be vented through the channels while the web is in contact with the roller.

SUMMARY OF THE INVENTION

It is an object of the present invention to provide a backup roller assembly with backup rollers made of a conductive or non-conductive material for conveying a web.

It is another object of the present invention to provide a backup roller assembly having backup rollers that are light weight and of low inertia.

It is yet another object of the present invention to provide a backup roller assembly, wherein both the web and rollers of the assembly are of a conductive material, the rollers being of a light weight material.

Still another object of the present invention is to provide a backup roller assembly with backup rollers comprising thin-walled aluminum tubing filled with an expanded urethane foam.

It is yet another object of the present invention to provide a process for making a backup roller by filling a thin-walled aluminum tube with urethane foam, and attaching journals to the ends of the aluminum tube using the adhesion of the foam for the attachment. After the tube is filled with the urethane foam, the foam is cured properly and centerless grounded on a wide wheel centerless grinder to provide the proper outer diameter for the tube.

BRIEF DESCRIPTION OF THE DRAWINGS

For a better understanding of the invention, as well as other objects and further features thereof, reference is made to the following detailed description of the preferred embodiments taken with the following drawings wherein.

DETAILED DESCRIPTION OF THE PREFERRED EMBODIMENTS

While the present invention will hereinafter be described in connection with various embodiments thereof, it will be understood that it is not intended to limit the invention to these embodiments. On the contrary, it is intended to cover all alternatives, modifications and equivalents that may be included within the spirit and scope of the invention as defined by the appended claims.

Figure 1:
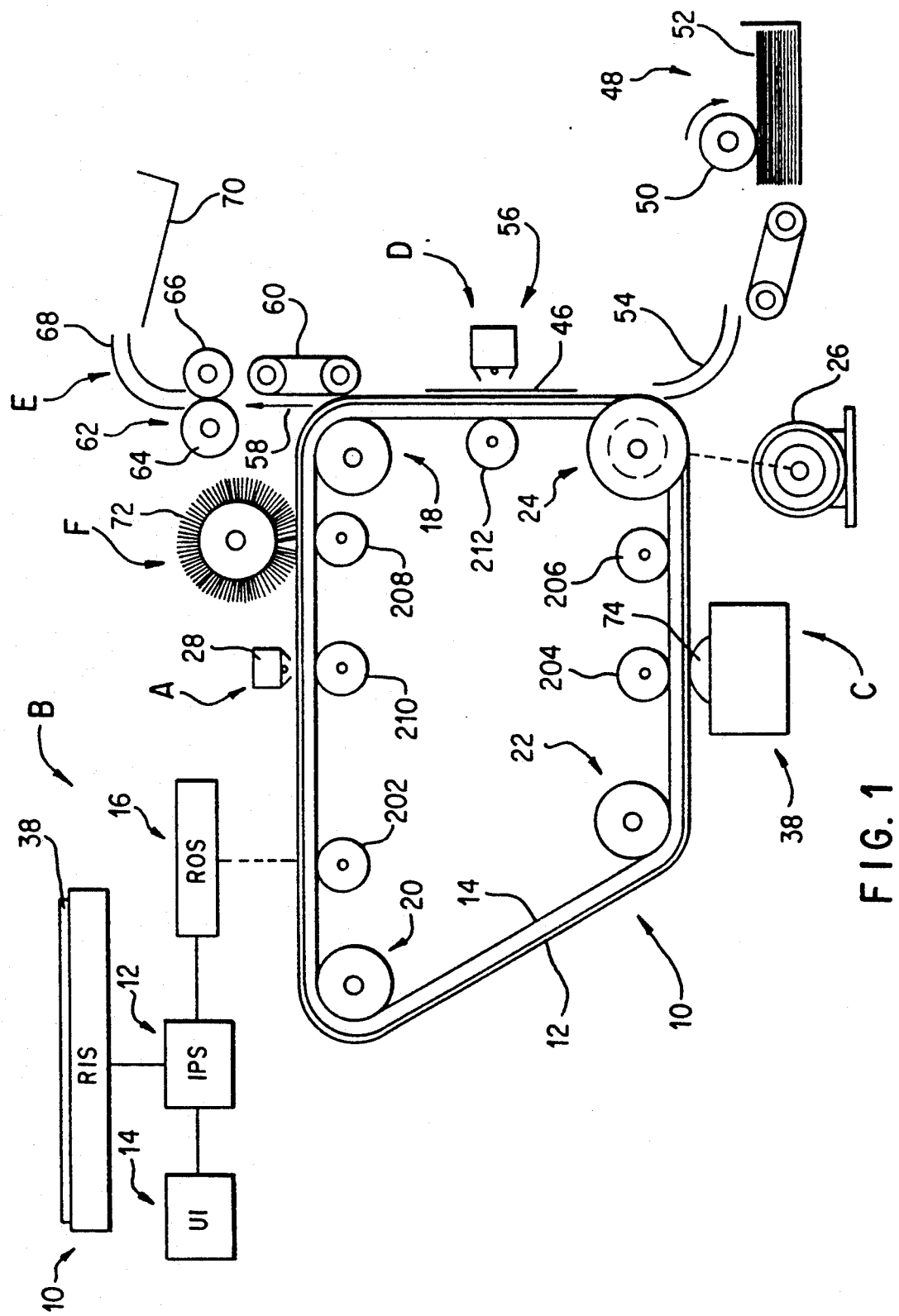
FIG. 1 is a schematic elevational view depicting an electrophotographic printing machine incorporating the backup roller assembly of the present invention.

For a general understanding of the features of the present invention, reference is made to the drawings. In the drawings, like reference numerals have been used throughout to designate identical elements. FIG. 1 schematically depicts the various elements of an illustrative electrophotographic printing machine incorporating the apparatus of the present invention therein. It will become evident from the following discussion that this apparatus is equally well suited for use in a wide variety of printing machines and is not necessarily limited in its application to the particle embodiment depicted herein.

1. Electrophotographic Printing Using The Backup Roller Assembly

Inasmuch as the art of electrophotographic printing is well known, the various processing stations employed in the FIG. 1 printing machine will be shown hereinafter schematically and their operation described briefly with reference thereto.

Turning now to FIG. 1, the electrophotographic printing machine employs a belt 10 having a photoconductive surface 12 responsive to infrared and/or visible light deposited on a conductive substrate 14. Preferably, photoconductive surface 12 is made from a selenium alloy with conductive substrate 14 being made from an aluminum alloy which is electrically grounded. Other suitable photoconductive surfaces and conductive substrates may also be employed. Belt 10 moves in the direction of arrow 61 to advance successive portions of photoconductive surface 12 through the various processing stations disposed about the path of movement thereof. As shown, belt 10 is entrained about rollers 18, 20, 22 and 24. Roller 24 is coupled to motor 26 which drives roller 24 so as to advance belt 10 in the direction of arrow 61. Rollers 18, 20 and 22 are idler rollers which rotate freely as belt 10 moves in the direction of arrow 61.

Initially, a portion of belt 10 passes through charging station A. At charging station A, a corona generating device, indicated generally by the reference numeral 28, charges a portion of photoconductive surface 12 of belt 10 to a relatively high, substantially uniform potential.

Next, the charged portion of photoconductive surface 12 is advanced through exposure station B. At exposure station B, an original document 38 is positioned on a raster input scanner (RIS), indicated generally by the reference numeral 101. The RIS contains document illumination lamps, optics, a mechanical scanning drive, and a charge coupled device (CCD array). The RIS captures the entire original document and converts it to a series of raster scan lines and (for color printing) measures a set of primary color densities, i.e., red, green and blue densities at each point of the original document. This information is transmitted to an image processing system (IPS) indicated generally by the reference numeral 21. IPS 21 is the control electronics which prepare and manage the image data flow to the raster output scanner (ROS), indicated generally by the reference numeral 16. A user interface (UI), indicated generally by the reference numeral 14, is in communication with the IPS. The UI enables the operator to control the various operator adjustable functions. The output signal from the UI is transmitted to IPS 21. The signal corresponding to the desired image is transmitted from IPS 21 to ROS 16, which creates the output copy image. ROS 16 lays out the image in a series of horizontal scan lines with each line having a specified number of pixels per inch. The ROS includes a laser having a rotating polygon mirror block associated therewith. The ROS exposes the charged photoconductive surface of the printer.

At development station C, a developer unit, indicated generally by the reference numeral 38, transports a single component developer material of toner particles into contact with the electrostatic latent image recorded on photoconductive surface 12. Toner particles are attracted to the electrostatic latent image forming a toner powder image on photoconductive surface 12 of belt 10 so as to develop the electrostatic latent image. A plurality of developer units (containing, for example, cyan, magenta and yellow developer) would be used for color developing.

After development, belt 10 advances the toner powder image to transfer station D. At transfer station D, a sheet of support material 46 is moved into contact with the toner powder image. Support material 46 is advanced to transfer station D by a sheet feeding apparatus, indicated generally by the reference numeral 48. Preferably, sheet feeding apparatus 48 includes a feed roll 50 contacting the upper most sheet of a stack of sheets 52. Feed roll 50 rotates to advance the upper most sheet from stack 50 into chute 54. Chute 54 directs the advancing sheet of support material 46 into contact with photoconductive surface 12 of belt 10 in a timed sequence so that the toner powder image developed thereon contacts the advancing sheet of support material at transfer station D.

Transfer station D includes a corona generating device 56 which sprays ions onto the backside of sheet 46. This attracts the toner powder image from photoconductive surface 12 to sheet 46. After transfer, the sheet continues to move in the direction of arrow 58 onto a conveyor 60 which moves the sheet to fusing station E.

Fusing station E includes a fuser assembly, indicated generally by the reference numeral 62, which permanently affixes the powder image to sheet 46. Preferably, fuser assembly 62 includes a heated fuser roller 64 and a roller 66 with the toner powder image contacting fuser roller 64. In this manner, the toner powder image is permanently affixed to sheet 46. After fusing, chute 68 guides the advancing sheet to catch tray 70 for subsequent removal from the printing machine by the operator.

Invariably, after the sheet of support material is separated from photoconductive surface 12 of belt 10, some residual particles remain adhering thereto. These residual particles are removed from photoconductive surface 12 at cleaning station F. Cleaning station F includes a preclean corona generating device (not shown) and a rotatably mounted fibrous brush 72 in contact with photoconductive surface 12. The pre-clean corona generator neutralizes the charge attracting the particles to the photoconductive surface. These particles are cleaned from the photoconductive surface by the rotation of brush 72 in contact therewith. Subsequent to cleaning, a discharge lamp (not shown) floods photoconductive surface 12 with light to dissipate any residual charge remaining thereon prior to the charging thereof for the next successive imaging cycle.

At each of the stations along the photoreceptor web (stations A-D and F) can be located a backup roller on the inside of the web for pressing against the inside surface of the web. As can be seen in FIG. 1, backup roller 202 is shown for pressing against the photoreceptor web at exposure station B, backup roller 204 for applying pressure at developer stations C, and backup roller 208 for applying pressure against the inside of photoreceptor 10 at cleaning station F. Backup rollers 210 and 212 are shown at charging station A and transfer station D, respectively. Each backup roller applies pressure to the inside of the photoreceptor web at the respective locations to minimize web movement (vibrations, slackening, etc.). It should be noted that more than one backup roller could be used in place of backup roller 204 in a color printer. In color printing, four developing stations may be used for the application of four different colors to the photoreceptor web. Thus, a backup roller at each developer station would be used. Backup roller 206 is an encoder roller located adjacent drive roller 24.

The foregoing description is sufficient for purposes of the present application to illustrate the general operation of an exemplary electrophotographic printing machine incorporating the features of the present invention therein.

2. Extrusion of Backup Rolls

Figure 2:
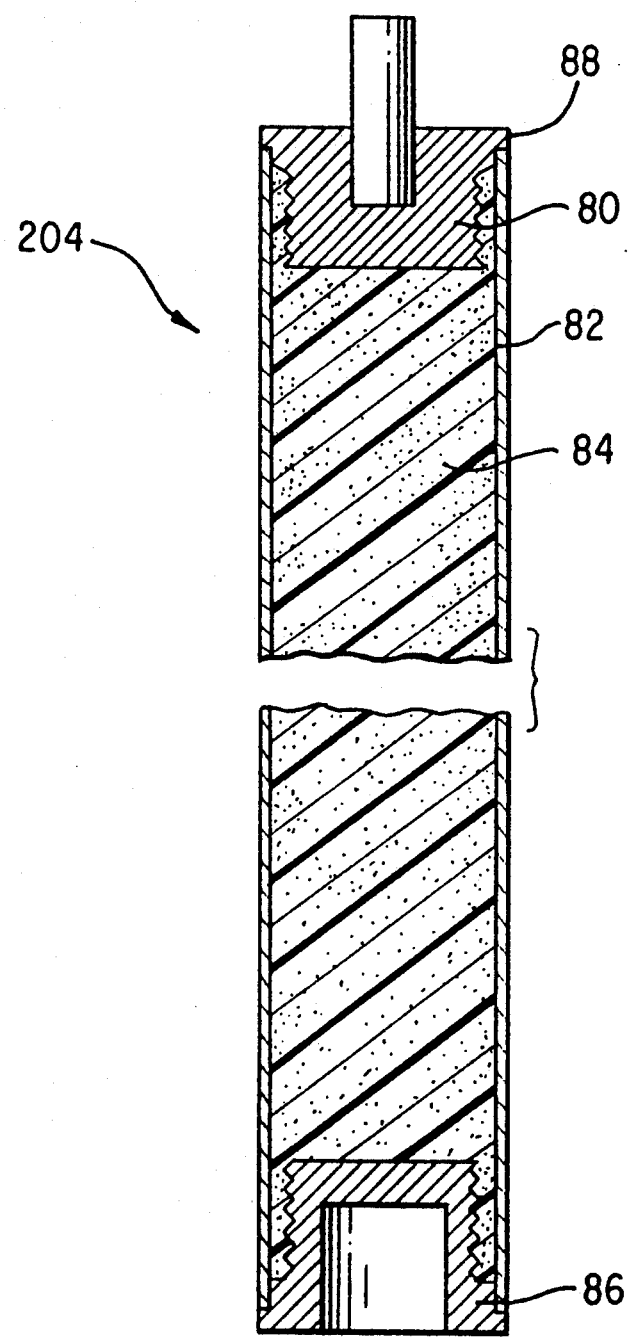
FIG. 2 is an elevational view of the backup roller of the present invention.
Figure 3:
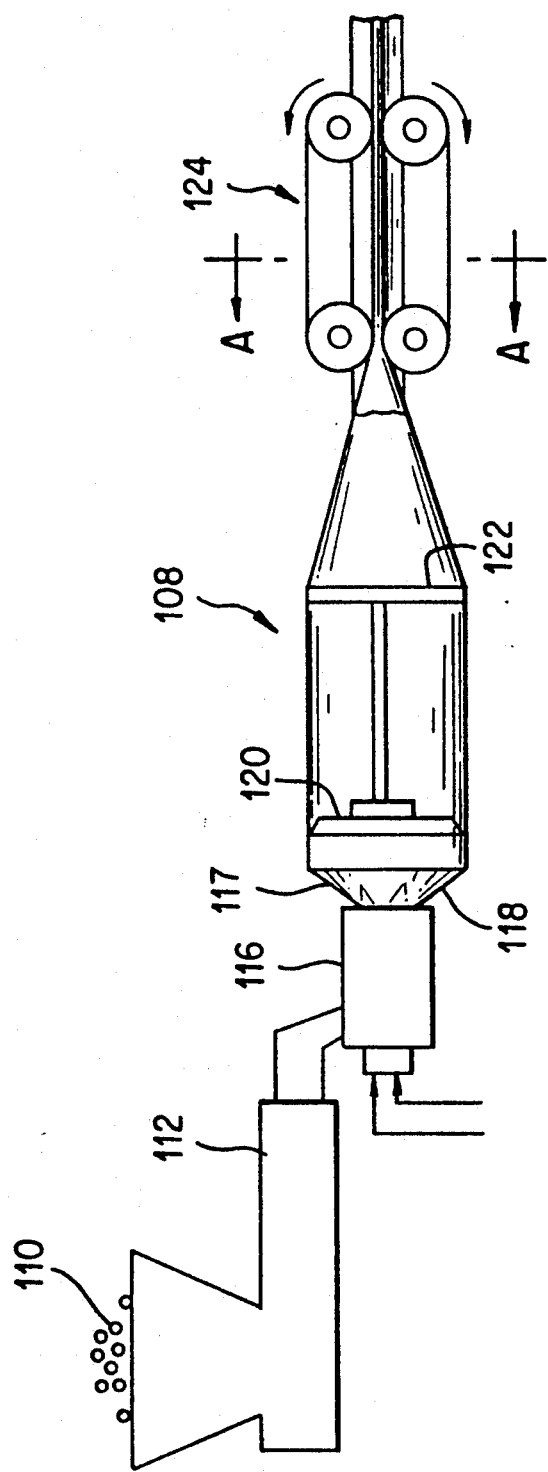
FIG. 3 is a schematic sectional view in elevation of a tube extrusion apparatus for producing the backup roller of the present invention.

The backup rollers 202, 204, 206, 208 (FIG. 2 is a schematic sectional view of one such roller) are preferably formed by an extrusion process. As can be seen in FIG. 3, pellets 110, such as aluminum (or other metal or plastic) pellets, are fed to a conventional extruder 112, such as a single or multiple-screw extruder or other suitable device such as a melt pump (not shown), using a gravity feed hopper or other suitable powered or gravity feeder. The pellets 110 are melted in the extruder 112 and the molten material is pumped by the extruder 112 through an annular thin-film extrusion die 116. The resulting extruded tubular film 117 is pulled through expansion zone 118, stretched over sizing disk 120, pulled over stabilizing disk 122 and pulled away and processed downstream from stabilizing disk 122 by tubular film puller 124. The side of extruded tubular film 117 facing the viewer is not shown in order to more clearly illustrate the sizing disk 120, stabilizing disk 122 and tubular film puller 124.

Figure 4:
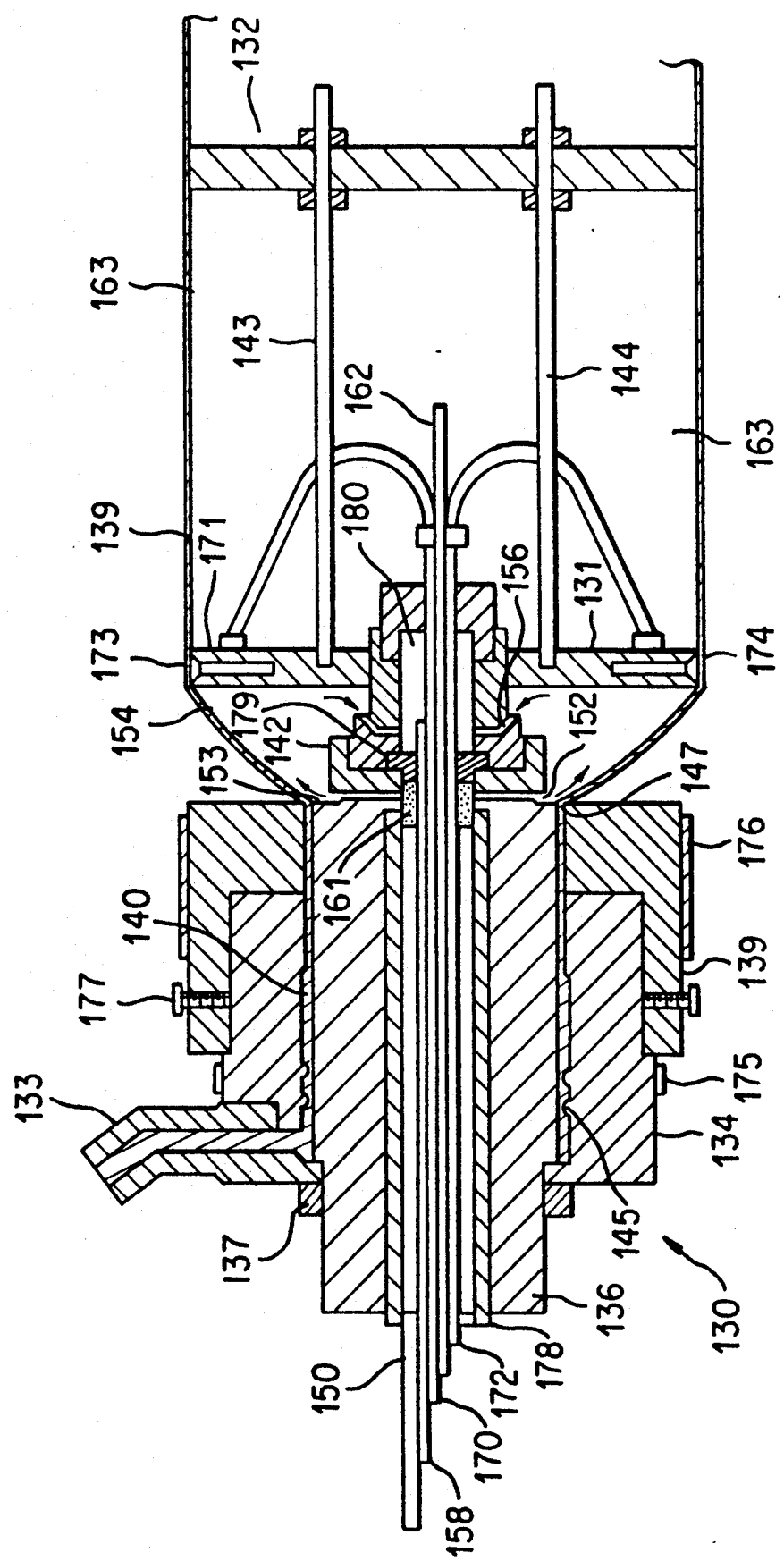
FIG. 4 is a schematic sectional view of one embodiment of an extrusion and shaping dye assembly for making the present invention.

Referring to FIG. 4, a cross-head extrusion die 130 is illustrated which may be used as the extrusion die 116 of the extrusion system shown FIG. 3. This cross-head extrusion die 130 is coupled to a sizing disk 131 and stabilizing disk 132. The cross-head extrusion die 130 comprises a die adapter 133 coupled to an annular die body 34 which encircles a die mandrel 136. The die mandrel 136 is secured to the annular die body 134 by a lock nut 137 threaded on to die mandrel 136. Mounted to the annular die body 134 is an annular adjustable die face 138 which also encircles the die mandrel 136. The adjustable die face 138 allows adjustment of the die gap to compensate for film thickness variations around the circumference of the extruded tubular film 139. Annular die body 134 and annular adjustable die face 138 are spaced from die mandrel 136 and cooperate therewith to form an annular extrusion flow channel 140. A mandrel extension 142 couples sizing disk 131 to die mandrel 136. Support rods 143 and 144 or other suitable support means secure stabilizing disk 132 to sizing disk 131.

Figure 5:
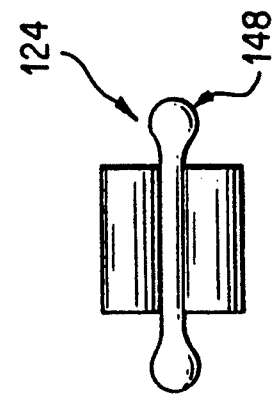
FIG. 5 is a section view along line AA of FIG. 1.

In operation, a molten material, such as molten metal or plastic, from an extruder, such as the extruder 112 shown in FIG. 3 is pumped into die adapter 133 of crosshead extrusion die 130, through annular extrusion flow channel 140 optionally containing choke ridges 145 (flow resistors) and out die outlet 147 to form an extruded tubular film 139. The choke ridges 145 minimize the effect of weld line formation due to flow separation at the entrance to the annular extrusion flow channel 140. The extruder supplies the molten material to the cross-head extrusion die 130 under sufficient pressure to force the molten material through annular extrusion flow channel 140 and out the die outlet 147. Typical extruders include the ZSK-30 twin-screw extruder with a maximum pressure rating of about 2,600 psi (17,900 kPa) and single-screw extruders which can develop pressures on the order of about 10,000 psi (68,900 kPa). Extruded tubular film 139 is pulled over sizing disk 131 and stabilizing disk 132 by a suitable tube puller, such as the tube puller 124 illustrated in FIGS. 3 and 5. In the sectional view shown in FIG. 5, the extruded tubular film 139 is contacted by the tube puller 124 in a flattened region extending longitudinal along the extruded tubular film 139, and segments 148 having a light bulb shaped cross section extend out from each side of tube puller 124. Since the segments 148 are not flattened, no creases are formed along the sides of extruded tubular film 139.

Figure 6:
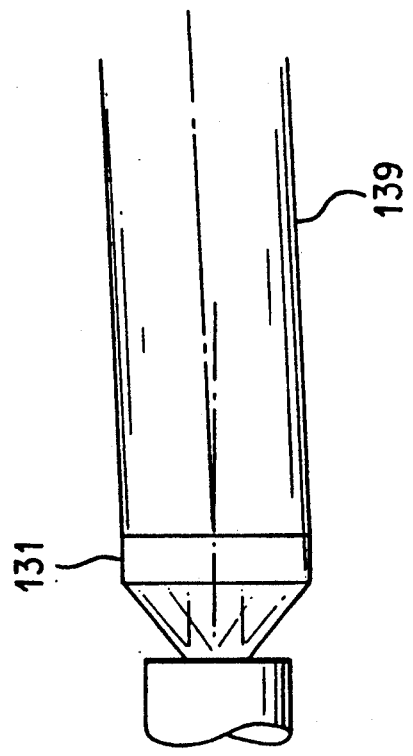
FIG. 6 is a schematic sectional view of an extrusion and shaping dye assembly without a stabilizing disk.
Figure 7:
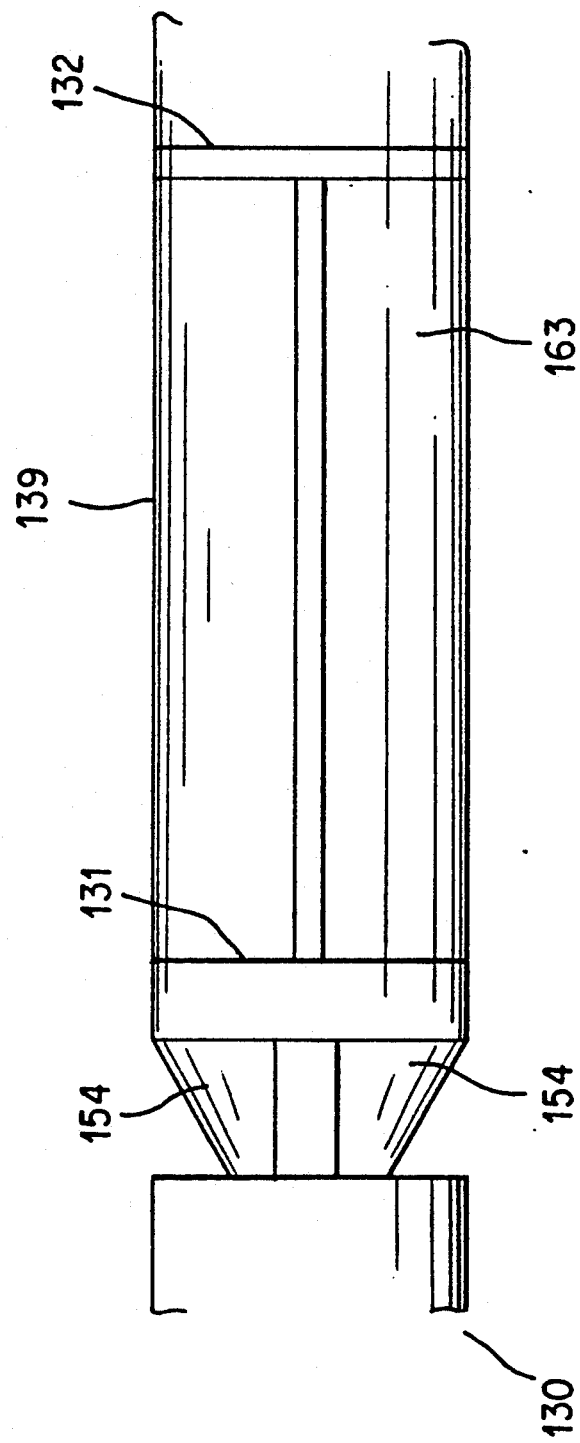
FIG. 7 is a schematic sectional view of an extrusion and shaping dye assembly with a stabilizing disk.

Without downstream stabilization such as effected by stabilizing disk 132, it is possible for extruded tubular film 139 to not be coaxial with sizing disk 131 as shown in FIG. 6. If the axis of the extruded tubular film 139 moves during operation, the circumference of extruded tubular film 139 can change resulting in the final product having circumference variations along its axis which can easily exceed required tolerances for applications requiring a high degree of precision. Even if tube segments have identical circumferences, their cross-sectional center points will not be collinear. Thus, a stabilizing disk 132 is preferred to maintain coaxial alignment between extruded tubular film 139 and sizing disk 131 as illustrated in FIG. 7. Further, the stabilizing disk prevents downstream disturbances (such as vibrations or cutting influences) from being felt upstream especially in the melt bubble in the expansion zone 154. Without a stabilizing disk vibrations or cuts downstream cause circumferential rings to form in extruded tubular film 139 at the leading edge of the sizing disk 131.

Referring again to FIG. 4, pressurized air or other suitable fluid is supplied through air line 150, into at least two air channels 152, and through at least one recess 153 outwardly from the axis of the mandrel extension 142 to provide an air pillow within expansion zone 154 for expanding and supporting extruded tubular film 139 circumferentially surrounding the mandrel extension 142 as it emerges from die outlet 147 and is pulled over sizing disk 131 which has a larger diameter than die mandrel 136. Air from the expansion zone 154 is allowed to exit the crosshead extrusion die 130 through air exhaust channels 156 and air line 158. It is preferred that air exhaust channels 156 are angled away from die outlet 147 to prevent accidental plugging by molten material during startup, shutdown and the like. The air supplied to the expansion zone 154 serves to expand, cool or heat, and provide physical support in the form of an air pillow for the extruded tubular film 139 and to maintain spacing between the extruded film 139 and mandrel extension 142 as shown in FIGS. 4 and 7. The air supplied to the expansion zone 154 is prevented from exiting between the extruded tubular film 139 and peripheral surface 160 of sizing disk 131 by the tight seal between the extruded tubular film 139 and peripheral surface 160 of sizing disk 131. This prevents the product tube 139 from assuming a non-concentric configuration relative to the sizing disk 131. Prior to introducing air from air line 150 into inlet channels 152, the air is passed through a baffle 161 to diffuse and control the air velocity thereby minimizing the formation of local nonuniform patterns and strong air currents in the air pillow formed in expansion zone 154. Pressurized air or other suitable gas such as nitrogen is supplied through air line 162 into stabilization zone 163 between sizing disk 131 and stabilizing disk 132 to stabilize and prevent collapse of extruded tubular film 139 as it is pulled past the sizing disk 131. The air inlet to stabilization zone 163 may simply be via a single tube such as air line 162.

Referring again to FIG. 4, a valve (not shown) is fitted to the outlet of air line 158 to control the air flow fitted to the outlet of air line 158 to control the air flow from expansion zone 154. Cooling fluid is introduced through cooling fluid inlet line 170 into an annular cooling chamber 171 located near the periphery of sizing disk 131 and removed from annular cooling chamber 171 through cooling fluid outlet line 172. The upstream corner edge 173 of sizing disk 131 preferably has a reasonably sharp angular cross section to prevent snagging or chattering of extruded tubular film 139. Moreover, the peripheral surface 174 of sizing disk 131 may, if desired, be gradually tapered toward the axis of the sizing disk 131 in the downstream direction to compensate for temperature shrinkage.

The temperature of the cross-head extrusion die 130 is controlled by regulating the electrical power to resistance heater band 175 surrounding annular die body 134 and resistance heater band 176 surrounding adjustable die face 138. At least three, and preferably 8 to 16 spacing adjustment bolts 177 are arranged around the entire periphery of adjustable die face 138 in a generally radial orientation although other suitable bolt configurations may be employed if desired. The lines for air and cooling fluid are fed through a liner sleeve 178 fitted along the axis of die mandrel 136. The liner sleeve 178 may comprises insulating material, e.g. a ceramic liner, which insulates the air and cooling fluid lines from heat emanating from the mandrel 136 and promotes stability of the temperature of the die mandrel 136, phenolic resin, etc. A seal 179 of brass or other suitable material in the hollow core 180 of mandrel extension 142 functions as an air barrier between air inlet channels 152 and air exhaust channels 156.

After extrusion of the tubing, the tubing is cut to the desired length, the length being at least equal to the width of the photoreceptor web to be used in the xerographic process. After cutting the tubing to the desired length, the tubing must be ground to a precise outer diameter. Due to the thinness of the tubing, however, the tubing can be crushed when pressed against a grinder. To overcome this problem, the tubing is first filled with a filling material, preferably a foam such as a urethane foam, and preferably a filling material having some conductive properties for grounding the photoreceptor web.

The filling material, such as the urethane foam, also achieves the purpose of attaching journals to each of the two ends of the tubes. The journals are inserted at each end of the tube while filling the tube with the foam. The journals adhere to the tubing due to the adhesiveness of the foam, and the shoulder 88 on each of the journals seals the foam within the tube. The shoulders on the journals provide electrical grounding after the tubing is filled and the foam is cured.

A mixing and metering device can be used in the present invention. A two-component urethane material is mixed and metered in a precise quantity into the tubing. Due to the pressure that builds up because of the expansion of the urethane foam after mixing, a mold can be used to contain the pressurized foam. The tubing with a journal at one end is placed in the mold, after which the mixed urethane material is metered into the tubing. When the second journal is inserted at the open end of the tubing after filling, the mold is closed. The foam (5 to 10 lb/ft$^3$) is cured while in the mold, the curing relieving excess pressure of the foam (foam pressure builds up to 20-30 psi during curing). A mold which allows for the placement of a plurality of tubes therein can be used in the manufacturing process. The foam-filled roller should not be immediately ground, but rather allowed to stabilize (e.g. overnight) to let out any remaining excess gas.

Once the tubing is allowed to stabilize after the journals are attached, the tubing can be ground to the exact outer diameter using a wide wheel centerless grinder. Then using the outer diameter as a measure, the journals are ground or machined to provide shaft or bearing housing from the oversized journal blanks without tight tolerance in the piece part.

In FIG. 2, backup roller 204 which is used at developing station C in FIG. 1, is shown with a foam 84 within the tubing used for adhering each of the two end journals 80, 86 onto each end of the tube 82. Due to the presence of the foam 84, the thickness of the tubing wall 82 can be very small, on the order of 1/30,000 to 1/20,000 of an inch. The tubing can be a metal, such as steel or aluminum, which can be anodized or roughened after grinding. The tube 82 can also be extruded from a polymeric material, or be made from a glass or ceramic material. It should be noted that though backup roller 204 is depicted in FIG. 2, any of the aforementioned backup rollers can be formed by the process disclosed herein.

The invention has been described in detail with particular reference to preferred embodiments thereof, but it will be understood that variations and modifications can be effected within the spirit and scope of the invention as described herein above and as defined in the appended claims.

What is claimed is:

1. An electrostatographic printing system comprising:
   a photoreceptor web;
   means for charging said photoreceptor web;
   means for applying a latent image on said charged photoreceptor web;
   means for developing said latent image on said photoreceptor web;

means for transferring the developed image onto a substrate; and means for cleaning the photoreceptor web;

wherein said photoreceptor web comprises a photoconductive material responsive to at least one of visible or infrared light; and at least one backup roller for applying pressure to an inside surface of the photoreceptor web comprising a thin-walled foam filled tubing with journals attached to each end of the tubing by means of a foam within the tubing, said journals having a shoulder portion with an outer diameter which is substantially the same as an outer diameter of said tubing.

2. The printing system of claim 1, wherein said tubing is selected from the group consisting of glass, ceramic, extruded metal and polymer tubing.

3. The printing system of claim 2, wherein said tubing comprises aluminum and said foam is a urethane foam.

4. The printing system of claim 1, wherein said thin-walled tubing has a wall thickness of from about 1/30,000 inch to about 1/20,000 inch.

5. The printing system of claim 1, wherein each of said journals attached to said tubing comprises a shoulder for sealing the foam within the tubing and for providing electrical grounding.

6. The printing system of claim 1, wherein said at least one backup roller is positioned inside the photoreceptor web opposite a printing station selected from said means for charging, said means for applying, said means for developing, said means for transferring and said means for cleaning.

7. The printing system of claim 1, wherein said at least one backup roller is an encoder roller.

8. A printing system of claim 1, wherein said thin-walled foam filled tubing is ground by centerless grinding to a precise outer diameter.

9. An electrostatographic printing system comprising:

a photoreceptor web;

means for charging said photoreceptor web;

means for applying a latent image on said charged photoreceptor web;

means for developing said latent image on said photoreceptor web;

means for transferring the developed image onto a substrate; and means for cleaning the photoreceptor web;

wherein said photoreceptor web comprises a photoconductive material responsive to at least one of visible or infrared light; and at least one backup roller for applying pressure to an inside surface of the photoreceptor web comprising a thin-walled foam filled tubing with journals attached to each end of the tubing by means of a foam within the tubing; said foam surrounding an inwardly extending portion of the journals.

* * * * *